(12) United States Patent
Hatakeyama et al.

(10) Patent No.: US 8,721,089 B2
(45) Date of Patent: May 13, 2014

(54) IMAGE PROJECTION APPARATUS HAVING PLURAL INTERCHANGEABLE PROJECTION OPTICAL SYSTEMS

(75) Inventors: Junichi Hatakeyama, Utsunomiya (JP); Azusa Sugawara, Yokohama (JP)

(73) Assignee: Canon Kabushiki Kaisha (JP)

( * ) Notice: Subject to any disclaimer, the term of this patent is extended or adjusted under 35 U.S.C. 154(b) by 121 days.

(21) Appl. No.: 13/402,016

(22) Filed: Feb. 22, 2012

(65) Prior Publication Data

US 2012/0218527 A1 Aug. 30, 2012

(30) Foreign Application Priority Data

Feb. 24, 2011 (JP) .................................. 2011-038299

(51) Int. Cl.
*G03B 21/14* (2006.01)

(52) U.S. Cl.
USPC ................... 353/38; 353/33; 353/34; 353/37; 353/79; 353/94; 348/744; 348/747; 359/362; 359/365

(58) Field of Classification Search
USPC ......... 353/20, 31, 33, 34, 37, 38, 79, 94, 122; 359/362, 365, 371, 380, 618, 622; 348/345, 350, E5.045, 743–747; 348/E9.026; 349/5, 7–9, 25
See application file for complete search history.

(56) References Cited

U.S. PATENT DOCUMENTS

| | | | | |
|---|---|---|---|---|
| 5,760,875 A | * | 6/1998 | Daijogo et al. | .................. 353/31 |
| 6,377,305 B2 | * | 4/2002 | Onuki | ............................ 348/345 |
| 6,587,159 B1 | * | 7/2003 | Dewald | ......................... 348/744 |
| 2007/0033680 A1 | * | 2/2007 | Takahashi | ...................... 977/869 |

FOREIGN PATENT DOCUMENTS

| | | |
|---|---|---|
| JP | 2001-145047 A | 5/2001 |
| JP | 4401499 A | 1/2010 |

\* cited by examiner

*Primary Examiner* — Sultan Chowdhury
(74) *Attorney, Agent, or Firm* — Rossi, Kimms & McDowell LLP

(57) ABSTRACT

The image projection apparatus is disclosed to which plural interchangeable optical units are selectively attachable. The apparatus includes a shift mechanism moving an attached optical unit, which is one of the plural interchangeable optical units that is attached to the apparatus, with respect to a light modulation element in a direction orthogonal to an optical axis, an actuator driving the shift mechanism, and a controller controlling drive of the actuator using a control parameter for moving the attached optical unit by a specific movement amount via the shift mechanism. The controller acquires information on at least one of a weight and an optical characteristic of the attached optical unit from a memory provided in one of the apparatus and the attached optical unit, and to change the control parameter using the acquired information.

7 Claims, 4 Drawing Sheets

| | DUTY RATIO | DRIVING TIME PERIOD | WEIGHT |
|---|---|---|---|
| STANDARD LENS | 60% | 15ms | 1 |
| WIDE-ANGLE LENS | 70% | 20ms | 1.2 |
| TELEPHOTO LENS | 80% | 25ms | 1.4 |

IMAGE PROJECTION APPARATUS HAVING PLURAL INTERCHANGEABLE PROJECTION OPTICAL SYSTEMS

BACKGROUND OF THE INVENTION

1. Field of the Invention

The present invention relates to an image projection apparatus to which a projection optical system is interchangeably attached, particularly to an image projection apparatus including a shift mechanism of the attached projection optical system.

2. Description of the Related Art

Image projection apparatuses, such as a liquid crystal projector and a micromirror projector, project light modulated by a light modulation element such as a liquid crystal panel or a digital micromirror device onto a projection surface such as a screen through a projection optical system such as a projection lens to display an image. Such image projection apparatuses are also used for multi-screen projection that projects a large screen image produced by connecting plural images projected by plural image projection apparatuses, the connection being made by adjoining of edges of the projected images, by overlapping of near-edge areas thereof and the like.

In the multi-screen projection, making the connection portions of the mutually adjacent projected images unnoticeable may require fine tuning of positions of the projected images with a pixel unit smaller than one pixel (for example, 0.5 pixel unit).

Such fine tuning of the projected image position is enabled by a shift mechanism that moves (shifts) the projection optical system in a direction orthogonal to its optical axis with respect to the light modulation element. The shift mechanism moves a holding member to which a lens barrel that houses the projection optical system therein is fixed (the projection optical system and the lens barrel are hereinafter collectively referred to as "a projection lens"), with a shift actuator such as a motor, with respect to a base member that is fixed to a chassis or the like of the image projection apparatus.

However, an image projection apparatus to which plural types of projection lenses such as a wide-angle lens and a telephoto lens are selectively (interchangeably) attached and which also includes the shift mechanism has the following problem. The plural types of projection lenses have mutually different weights or mutually different shift sensitivities (that is, positional change amounts of the projected image on the projection surface to a same movement amount of the projection lens). Therefore, even though control of the shift actuator is performed with a same control condition (same control parameter), the movement amount of the projection lens or an actual movement amount of the projected image is changed according to the weight or the shift sensitivity of the attached projection lens.

Japanese Patent No. 4401499 discloses an image projection apparatus that changes a parameter for controlling a shift actuator depending on a type of an attached interchangeable projection lens. This image projection apparatus allows attachment of plural types of projection lenses whose image circle sizes are mutually different. Specifically, this image projection apparatus distinguishes the type of the attached projection lens and changes a shift position (parameter) to stop drive of the shift actuator so as to limit a shiftable range of the attached projection lens to a range appropriate for the image circle thereof.

However, the image projection apparatus disclosed in Japanese Patent No. 4401499 does not consider that the movement amount of the projection lens or the projected image is changed depending on the weight or the shift sensitivity of the attached projection lens even though the shift actuator is controlled with the same control condition.

SUMMARY OF THE INVENTION

The present invention provides an image projection apparatus capable of accurately moving an attached projection lens by a specific movement amount, irrespective of difference in weight or shift sensitivity of interchangeable projection lenses (interchangeable optical units).

The present invention provides as one aspect thereof an image projection apparatus to which plural interchangeable optical units are selectively attachable, each of which includes a projection optical system projecting light modulated by a light modulation element provided in the apparatus onto a projection surface and whose at least one of weights and optical characteristics are mutually different. The apparatus includes a shift mechanism configured to move an attached optical unit, which is one of the plural interchangeable optical units that is attached to the apparatus, with respect to the light modulation element in a direction orthogonal to an optical axis of the projection optical system, an actuator configured to drive the shift mechanism, and a controller configured to control drive of the actuator using a control parameter for moving the attached optical unit by a specific movement amount via the shift mechanism. The controller is configured to acquire information on at least one of the weight and the optical characteristic of the attached optical unit from a memory provided in one of the apparatus and the attached optical unit, and to change the control parameter using the acquired information.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

Figure 1:
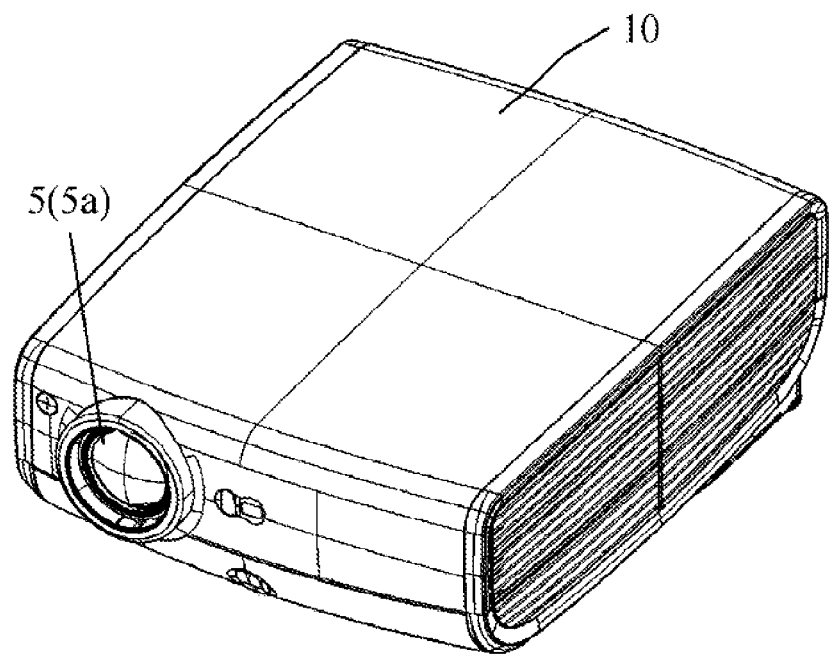
FIG. 1 is an external view of a projector that is an embodiment of the present invention.

FIG. 1 is an external view of a liquid crystal projector 10 as an image projection apparatus, which is an embodiment of the present invention. Reference numeral 5 denotes a projection lens barrel that holds a projection lens 5a as a projection optical system thereinside.

Although this embodiment describes the liquid crystal projector using a liquid crystal panel as a light modulation element, alternative embodiments of the present invention include image projection apparatuses using other light modulation elements than the liquid crystal panel, such as a digital micromirror device (DMD).

Figure 2:
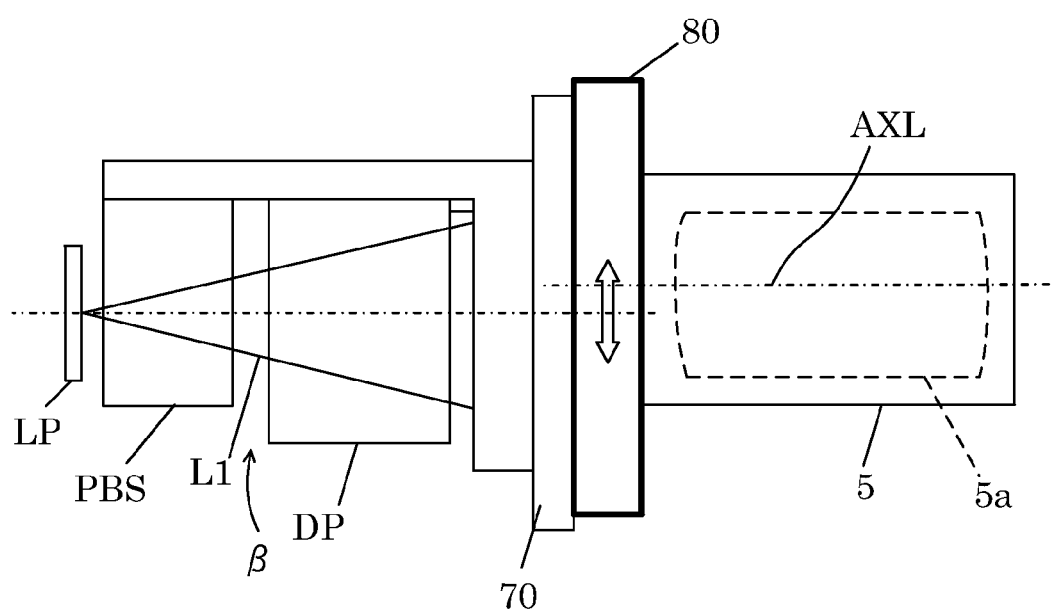
FIG. 2 shows an optical configuration of the projector of the embodiment.

FIG. 2 shows part of an optical configuration of the projector 10. Light from a light source lamp (not shown) enters, through a polarization conversion element (not shown), a color separating/combining optical system β constituted by a dichroic mirror (not shown), a polarization beam splitter PBS, a dichroic prism DP and other optical elements (not shown).

The polarization conversion element converts the light from the light source lamp, which is non-polarized white light, into polarized light having a specific polarization direction. The color separating/combining optical system β separates the entering white light into three color lights of R, G and B by the dichroic mirror and the polarization beam splitter PBS, and introduces the three color lights to three liquid crystal panels LP provided for the respective color lights. FIG. 2 shows only one liquid crystal panel LP corresponding to one of the three color lights.

The liquid crystal panel LP forms an original image corresponding to a video signal input from an outside to the projector 10, and modulates entering light according to the original image (in other words, according to the input video signal). The one color light L1 modulated by the liquid crystal panel LP enters the dichroic prism DP through the polarization beam splitter PBS. Two color lights modulated by the liquid crystal panels (not shown) are also introduced to the dichroic prism DP.

The dichroic prism DP combines the three entering modulated lights to introduce the combined modulated light to the projection lens 5a in the projection lens barrel 5. The projection lens 5a projects the combined modulated light onto a projection surface such as a screen (not shown) to display a projected image corresponding to the input video signal on the projection surface.

The projection lens barrel 5 shown in FIG. 2 is one of plural projection lens barrels whose at least one of weights and optical characteristics of the projection lenses are mutually different. The plural projection lens barrels including the projection lens barrel 5 are interchangeable optical units that are selectively attachable to the projector 10. The projection lens barrel 5 (and each of the other projection lens barrels) is detachably (interchangeably) attached to a shift plate 80 as a movable member that constitutes part of a lens shift mechanism described later.

The shift plate 80 is held movably in a vertical direction (upward and downward) as shown by a white allow in FIG. 2 by a shift base 70 that is a base member constituting a fixed portion of the lens shift mechanism. The vertical direction is a direction orthogonal to an optical axis AXL of the projection lens 5a. The vertical direction is hereinafter also referred to as "a shift direction", and the direction orthogonal to an optical axis AXL is hereinafter referred to as "an optical axis direction".

The projection lens barrel 5 and the shift plate 80 are thus held movably (shiftably) in the shift direction with respect to the color separating/combining optical system β, the liquid crystal panel LP and the shift base 70.

Figure 4:
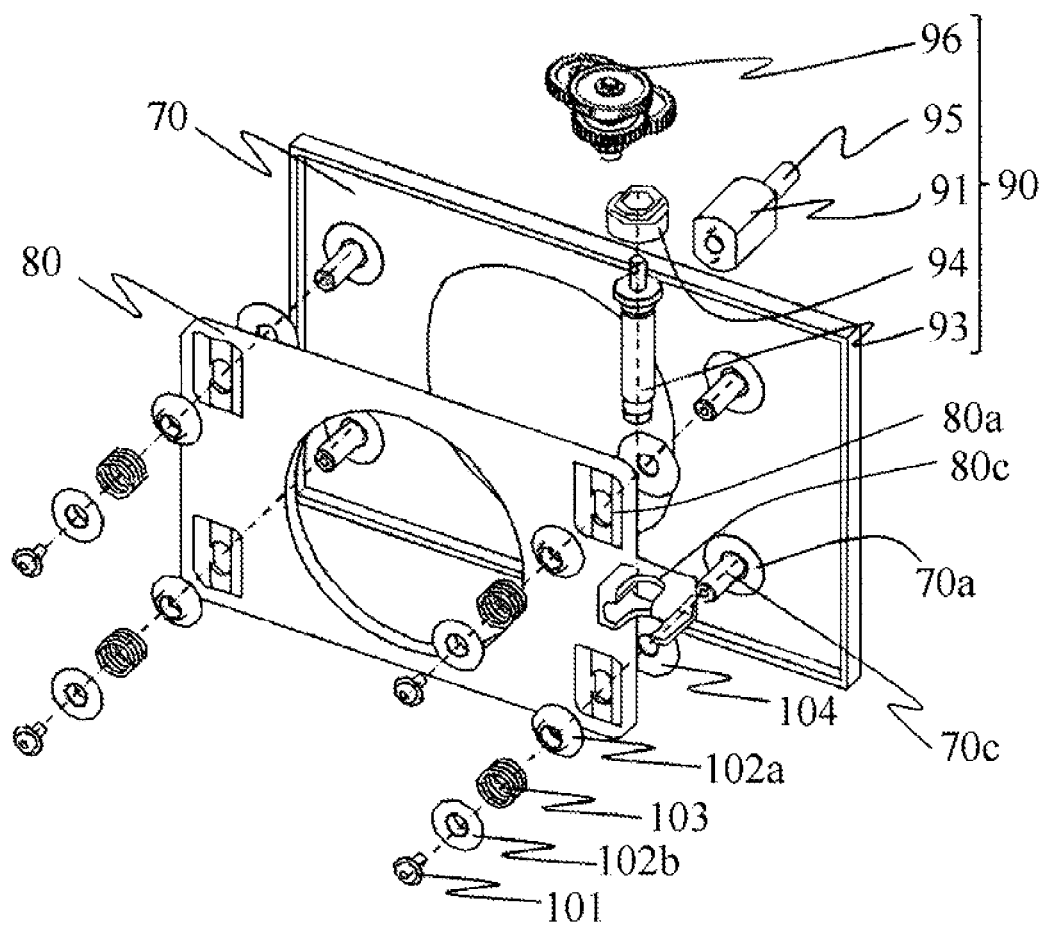
FIG. 4 is an exploded perspective view of a lens shift mechanism of the projector of the embodiment.

Next, a more detailed description of the configuration of the lens shift mechanism will be made using FIG. 4. The projection lens barrel 5 is attached to the shift plate 80 as mentioned above. The shift base 70 is provided with guide pins 70c protruding toward the shift plate 80 in the optical axis direction at four upper, lower, right and left portions thereof. The shift base 70 is formed with contact faces 70a around the guide pins 70c. On the other hand, the shift plate 80 is formed with elongated hole portions 80a extending in the vertical direction at four upper, lower, right and left portions thereof.

Washers 104 are attached onto the four guide pins 70c of the shift base 70, and then the guide pins 70c are inserted into the elongated hole portions 80a of the shift plate 80. The shift plate 80 is thus assembled to the shift base 70. Onto each of the guide pins 70c protruding from the elongated hole portions 80a, a bush 102a, a coil spring 103 and a bush 102b are attached in this order. Then, a screw 101 is tightened on a tip of each guide pin 70c: a head of the screw 101 prevents falling off of the bush 102b from the guide pin 70c. In this state, each of the coil springs 103 is compressed (charged) between the two bushes 102a and 102b, that is, between the head of the screw 101 and the shift plate 80, which presses the shift plate 80 against the contact faces 70a of the shift base 70 via the washers 104.

A driving part 90 includes (a) a DC motor 91 that is a shift actuator and attached to the shift base 70 via a motor supporting member (not shown) and (b) a screw shaft 93 held by the motor supporting member rotatably about a vertically extending axis. A nut 94 is engaged with a screw portion of the screw shaft 93. The nut 94 is held by a nut holding portion 80c formed in the shift plate 80.

A worm gear 95 is attached to an output shaft of the DC motor 91. Rotation of the DC motor 91 is transmitted to the screw shaft 93 through the worm gear and reduction gears 96 engaging therewith, which rotates the screw shaft 93. The rotation of the screw shaft 93 moves the nut 94 in the vertical direction together with the shift plate 80 with respect to the shift base 70. This movement of the shift plate 80 vertically shifts the projection lens barrel 5 (shown in FIG. 2) attached thereto.

Figure 3:
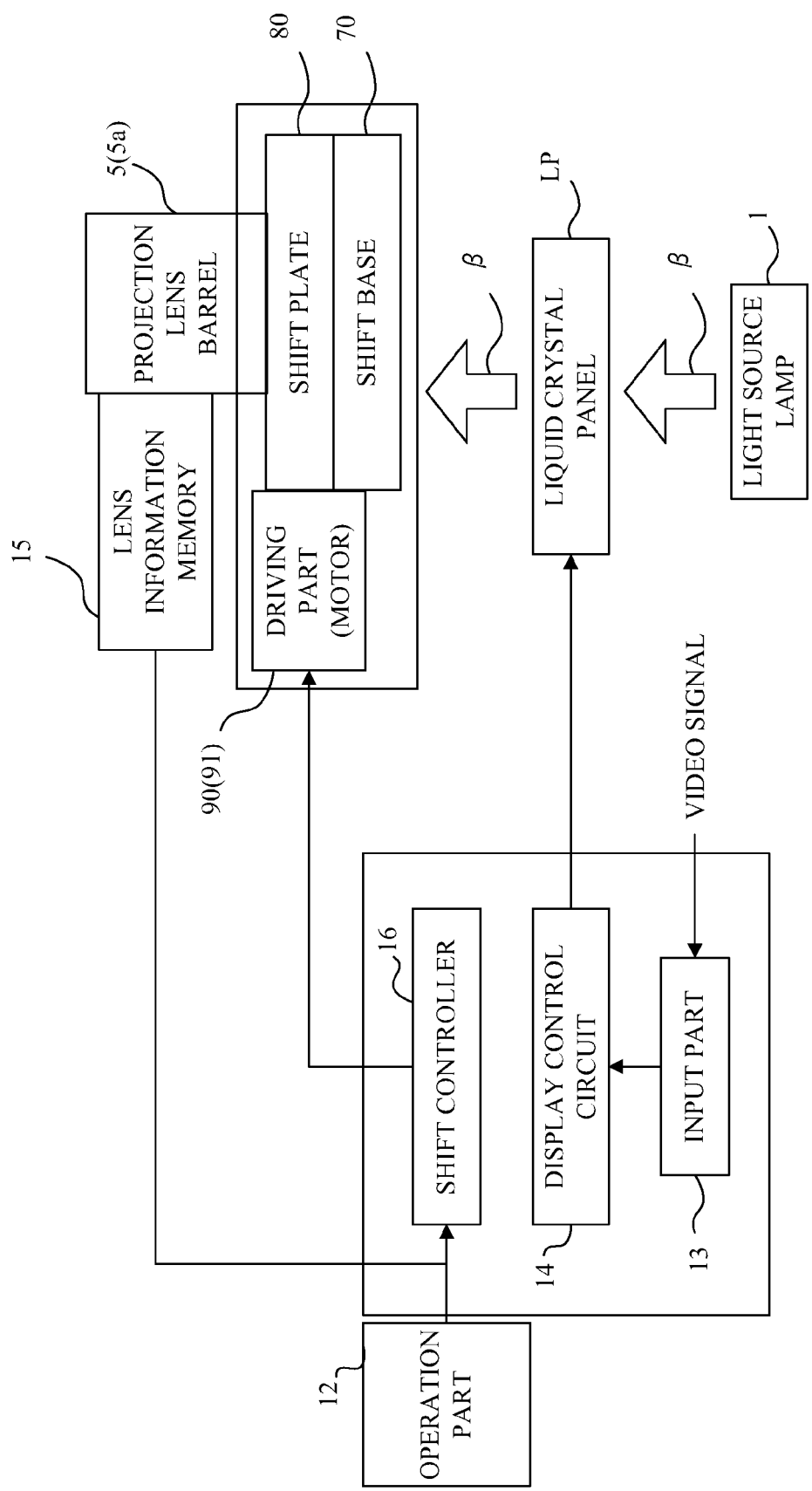
FIG. 3 is a block diagram showing a configuration of a shift control system of the projector of the embodiment.

FIG. 3 shows a configuration of a control system of the lens shift mechanism in this embodiment. FIG. 3 also shows the light source lamp 1, the liquid crystal panel LP and the projection lens barrel 5.

An operation part 12 of the projector is provided with operating members such as a power on/off switch to turn the power on and off and a shift operation button to instruct drive of the lens shift mechanism. The video signal from the outside is input to an input part 13. A display control circuit 14 converts the video signal input through the input part 13 into image signals of R, G and B to supply liquid crystal driving signals corresponding to these image signals to the liquid crystal panels LP for R, G and B.

The liquid crystal panels LP for R, G and B form the original images corresponding to the liquid crystal driving signals of R, G and B, and modulate, according to the original images, the light (R, G and B lights) entering thereinto from the light source lamp 1 through the color separating/combining optical system β. The R, G and B lights modulated by the liquid crystal panels LP for R, G and B are combined by the color separating/combining optical system β to enter the projection lens barrel 5. The combined light is projected onto the screen (not shown) by the projection lens 5a.

The projection lens barrel 5 has a lens information memory 15. The lens information memory 15 stores information on a weight and an optical characteristic of the projection lens barrel 5 (the information is hereinafter referred to as "lens information"). The optical characteristic includes not only basic optical characteristics of the projection lens 5a such as a focal length and an F-number, but also a shift sensitivity showing a positional change amount of the projected image on the projection surface to a movement amount in the shift direction (shift amount) of the projection lens 5a.

The plural projection lens barrels including the projection lens barrel 5 and selectively attachable to the projector of this embodiment have mutually different weights and mutually different optical characteristics. The lens information memory provided in each projection lens barrel stores the lens information on the weight and the optical characteristic of that projection lens barrel.

A shift controller 16 that is a controller provided in the projector is connected with the lens information memory 15 in response to the attachment of the projection lens barrel 5, through mount contacts provided in the shift plate 80 or a cable connected to the lens information memory 15. The shift controller 16 acquires the above-mentioned lens information from the lens information memory 15 provided in the attached projection lens barrel (attached optical unit) 5, and decides control parameters for controlling the DC motor 91 in the lens shift mechanism.

The shift controller 16 controls a driving voltage supplied to the DC motor 91 using the decided control parameters. The driving voltage is controlled by changing a duty ratio of a pulse signal as a motor driving signal:rotation speed of the DC motor 91 increases and movement speed (shift speed) of the projection lens barrel 5 also increases as the driving voltage increases (that is, as the duty ratio increases).

The control parameters decided by the shift controller 16 include parameters for rough adjustment of the position of the projection lens barrel 5 in the shift direction and parameters for fine adjustment thereof, which are mutually different control parameters. With the control parameters for the rough adjustment, the shift controller 16 rotates the DC motor 91 at a high rotation speed so as to fast move the projection lens barrel 5 in the shift direction. With the control parameters for the fine adjustment, the shift controller 16 rotates the DC motor 91 at a low rotation speed so as to finely adjust the position of the projection lens barrel 5. The position of the projection lens barrel 5 in the shift direction is hereinafter referred to as "a shift position".

The control parameters for the rough adjustment include the above-mentioned duty ratio of the motor driving signal (that is, the driving voltage) and a short brake time period during which short brake is applied to the DC motor 91 in order to improve stop accuracy of the DC motor 91 (that is, of the projection lens barrel 5). In addition, timing at which the short brake is applied to the DC motor 91 may be added to the control parameters for the rough adjustment in order to further improve the stop accuracy.

On the other hand, the control parameters for the fine adjustment are set such that the shift amount of the projection lens barrel 5 in response to one operation of the above-mentioned shift operation button provided in the operation part 12 may become a specific movement amount. The specific movement amount corresponds to a movement of the projected image on the projection surface by an amount equal to or less than its one pixel (that is, by one pixel or less). Specifically, the control parameters for the fine adjustment include a driving time period during which the above-mentioned driving signal is applied to the DC motor 91, the duty ratio and the short brake time period.

The shift controller 16 changes the control parameters for the fine adjustment using the lens information (weight and shift sensitivity) acquired from the projection lens barrel 5. The shift controller 16 prestores standard control parameters for the fine adjustment corresponding to the weight and shift sensitivity of a standard projection lens barrel (standard optical unit), and corrects the standard control parameters depending on the weight and shift sensitivity acquired from the attached projection lens barrel 5 to change the control parameters. The shift controller 16 may prestore a calculation expression that is used to calculate the control parameters and that includes as variables the weight and shift sensitivity. Then, the shift controller 16 may substitute the weight and shift sensitivity of the attached projection lens barrel 5 into the variables to calculate the control parameters, thereby changing the control parameters.

For example, in a case where a projection lens barrel having a larger weight than that of the standard projection lens barrel, such as a projection lens barrel having a longer focal length or a wider field angle than that of the standard projection lens barrel is attached to the projector, the duty ratio, which is one of the control parameters for the fine adjustment, is increased as compared with that of the standard projection lens barrel. Instead of or with the duty ratio, the driving time period may be extended as compared with that of the standard projection lens barrel. Such change of the control parameters makes it possible to shift the attached projection lens barrel in response to one operation of the shift operation button accurately by the specific movement amount, not only in the case where the standard projection lens barrel is attached, but also in the case where the telephoto projection lens barrel is attached. When the shift operation button is continuously operated so as to be regarded as plural operations thereof being performed, the shift controller 16 shifts the projection lens barrel by plural unit movement amounts each corresponding to the specific movement amount.

Figures 5, 6:
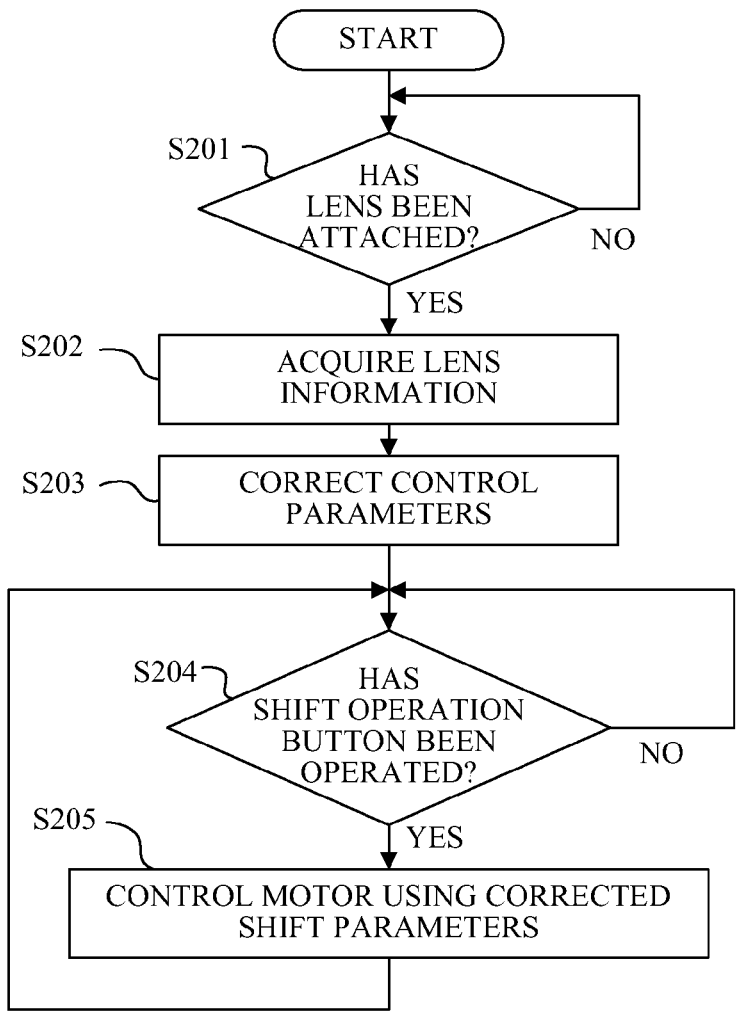
FIG. 5 is a flow chart of a shift control process performed by the projector of the embodiment.
FIG. 6 shows an example of change of control parameters in the projector of the embodiment.

FIG. 6 shows a setting example of the duty ratios and driving time periods for the standard projection lens barrel (standard lens), a wide-angle projection lens barrel (wide-angle lens) and a telephoto projection lens barrel (telephoto lens) with their weights (weight ratios) in a case of shifting these lens barrels upward, that is, in a direction opposite to a direction of gravitational force.

In the case of shifting the lens barrel upward, the duty ratio and driving time period are increased as the weight thereof increases. The short brake time period is decreased as the weight increases though not shown in FIG. 6.

On the other hand, in a case of shifting the lens barrel downward, though not shown in FIG. 6, the duty ratio and driving time period are decreased as the weight increases. The short brake time period is increased as the weight increases.

Although the setting example of FIG. 6 does not consider difference in the shift sensitivity, consideration thereof makes the duty ratios and driving time periods different from those in FIG. 6.

A flowchart of FIG. 5 shows a procedure of a shift control process including the change of the control parameters and the control of the DC motor 91, the process being performed by the shift controller 16 according to a computer program stored in the shift controller 16.

In response to start of the process, at step S201, the shift controller 16 determines whether or not the projection lens barrel 5 has been attached to the projector. The shift controller 16 can detect the attachment of the projection lens barrel 5, for example, through a sensor provided the shift plate 80. The shift controller 16 repeats this step until the determination that the projection lens barrel 5 has been attached to the projector is made, and proceeds to step S202 if the determination that the projection lens barrel 5 has been attached is made.

At step S202, the shift controller 16 acquires the lens information from the lens information memory 15 of the attached projection lens barrel 5. Then, at step S203, the shift controller 16 corrects (or calculates) the control parameters to be used to control the DC motor 91 for the fine adjustment of the shift position, using the acquired lens information. That is, the shift controller 16 changes the control parameters depending on the weight and shift sensitivity included in the lens information.

Next, at step S204, the shift controller 16 determines whether or not one operation of the shift operation button has been made. This operation of the shift operation button is to instruct the fine adjustment of the shift position. The shift controller 16 repeats this step until the determination that the shift operation button has been operated is made, and proceeds to step S205 if the determination that the shift operation button has been operated is made.

At step S205, the shift controller 16 controls the DC motor 91 using the control parameters (corrected control parameters) for the fine adjustment that have been corrected (or calculated) at step S203. This control enables accurate shift of the projection lens barrel 5 by the specific movement amount.

Thereafter, the shift controller 16 returns to step S204 to determine again whether or not the shift operation button has been operated (that is, whether or not the operation thereof has been being continued). If the operation has been being continued, the shift controller 16 proceeds to step S205 to shift the projection lens barrel 5 by the specific movement amount. Thus, the shift of the projection lens barrel by one unit movement amount corresponding to the specific movement amount is repeated.

This embodiment has described the case of changing the control parameters depending on both the weight and optical characteristic (lens sensitivity) of the projection lens barrel. However, the control parameters may be changed depending on at least one of the weight and optical characteristic of the projection lens barrel.

Moreover, this embodiment has described the case where the lens information memory is provided to the projection lens barrel and the projector (shift controller 16) acquires the lens information from the lens information memory. However, the projector may include a memory storing the lens information of various projection lens barrels and read (acquire) the lens information corresponding to identification information (such as model number or serial number) of the attached projection lens barrel from the memory.

Furthermore, although this embodiment has described the case of using the DC motor as the shift actuator, other actuators than the DC motor may be used.

In addition, although this embodiment has described the case where the lens shift mechanism shifts the projection lens barrel only in the vertical direction, the lens shift mechanism may shift the projection lens barrel in a horizontal direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-038299, filed on Feb. 24, 2011 which is hereby incorporated by reference herein in its entirety.

What is claimed is:

1. An image projection apparatus, to which plural interchangeable projection optical systems are selectively attachable, for projecting a projection image on a surface by the projection optical system attached to the apparatus, the apparatus comprising:
a light modulation element configured to modulate light from a light source;
a shift mechanism configured to move the projection optical system attached to the image projection apparatus in a direction orthogonal to an optical axis of the projection optical system, to move a position where the projection image is projected on the surface via the projection optical system;
an actuator configured to drive the shift mechanism; and
a controller configured to:
control drive of the actuator using a control parameter used to drive the shift mechanism; and
acquire information on at least one of a weight or an optical characteristic of the attached projection optical system, and change the control parameter according to the acquired information.

2. An image projection apparatus according to claim 1, wherein the control parameter changed by the controller is for moving the projection image projected on the surface by one pixel of the projection image or less.

3. An image projection apparatus according to claim 1, wherein the controller is configured to control, using the control parameter, at least one of a driving voltage applied to the actuator, a driving time period of the actuator, or a braking time period to apply a short brake to the actuator.

4. An image projection apparatus according to claim 1, wherein the control parameter includes a first parameter for moving the projection optical system at high speed and a second parameter for moving the projection optical system at a speed less than that of the first parameter, the first parameter and the second parameter being different from each other.

5. An image projection apparatus according to claim 1, wherein the controller is configured to control the actuator to move the projection optical system so that the projection image projected on the surface is moved by one pixel of the projection image.

6. An image projection apparatus according to claim 1, wherein the controller changes the control parameter according to a shift sensitivity that indicates a position change of a projection image on the surface with respect to the weight and a shift amount of the projection optical system.

7. An image projection apparatus according to claim 1, wherein plural interchangeable projection optical systems each have an optical characteristic different from each other.

* * * * *